(12) United States Patent
Sundholm

(10) Patent No.: US 10,234,063 B2
(45) Date of Patent: Mar. 19, 2019

(54) METHOD FOR FORMING A PIPE JOINT, PIPE JOINT AND FLANGE PART ARRANGEMENT

(71) Applicant: MARICAP OY, Vantaa (FI)

(72) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 439 days.

(21) Appl. No.: 14/888,463

(22) PCT Filed: Apr. 29, 2014

(86) PCT No.: PCT/FI2014/050310
§ 371 (c)(1),
(2) Date: Nov. 2, 2015

(87) PCT Pub. No.: WO2014/177766
PCT Pub. Date: Nov. 6, 2014

(65) Prior Publication Data
US 2016/0116092 A1    Apr. 28, 2016

(30) Foreign Application Priority Data

May 3, 2015 (FI) ...................................... 20135464

(51) Int. Cl.
*B21D 19/04* (2006.01)
*F16L 27/08* (2006.01)
(Continued)

(52) U.S. Cl.
CPC .......... *F16L 27/0849* (2013.01); *B21D 19/02* (2013.01); *B21D 19/04* (2013.01);
(Continued)

(58) Field of Classification Search
CPC ... F16L 23/003; F16L 23/0283; F16L 23/032; F16L 27/0849; B21D 19/02; B21D 19/04
(Continued)

(56) References Cited

U.S. PATENT DOCUMENTS 674,928 A * 5/1901 Mauran .......................... 285/368
977,226 A * 11/1910 Sargent ..................... 285/412 X
(Continued)

FOREIGN PATENT DOCUMENTS

CN     201909128 U     7/2011
CN     202532062 U    11/2012
(Continued)

OTHER PUBLICATIONS

Supplementary Partial European Search Report issued in corresponding European Application No. 14 79 1307 dated Nov. 22, 2016.
(Continued)

*Primary Examiner* — Greg Binda
*Assistant Examiner* — Zachary T Dragicevich
(74) *Attorney, Agent, or Firm* — Birch, Stewart, Kolasch & Birch, LLP

(57) ABSTRACT

Pipe joint, which is formed from the end portions of pipe sections to be joined together with the portions including a collar, and from flange parts which, as seen from the junction, are placed on different sides of the collars and tightened with applicable fixing members, such as with screws and nuts. The collar of the pipe section is formed from the wall of the end of the pipe section by shaping with a shaping member. The joint surface of the collar of at least one of the pipe sections to be joined is arranged to be divergent by the amount of an angle α, β from the plane perpendicular to the longitudinal axis of the pipe section. A method and to a flange part arrangement are disclosed.

24 Claims, 7 Drawing Sheets

(51) Int. Cl.
*F16L 23/032* (2006.01)
*F16L 23/028* (2006.01)
*B21D 19/02* (2006.01)
*F16L 23/00* (2006.01)
*B21D 19/12* (2006.01)

(52) U.S. Cl.
CPC ............ *B21D 19/12* (2013.01); *F16L 23/003* (2013.01); *F16L 23/0283* (2013.01); *F16L 23/032* (2013.01)

(58) Field of Classification Search
USPC .......................................... 285/368, 412, 184
See application file for complete search history.

(56) References Cited

U.S. PATENT DOCUMENTS

| | | | |
|---|---|---|---|
| 3,332,710 A * | 7/1967 | Doty | ........................ 285/368 X |
| 3,742,590 A * | 7/1973 | Douglas | .............. F16L 23/0283 |
| 3,780,421 A | 12/1973 | White, Jr. et al. | |
| 4,640,531 A | 2/1987 | Forster et al. | |
| 4,905,492 A | 3/1990 | Lobakk | |
| 5,421,623 A | 6/1995 | Cassin | |
| 2002/0021004 A1 | 2/2002 | Mitchell | |
| 2005/0129457 A1* | 6/2005 | Webjorn | ............... F16L 23/032 |
| 2005/0275223 A1 | 12/2005 | Kondo | |
| 2008/0093847 A1 | 4/2008 | Sundholm | |
| 2008/0136183 A1* | 6/2008 | Stangeland | ................... 285/412 |
| 2016/0245437 A1* | 8/2016 | Eriksson | ............. F16L 23/0283 |

FOREIGN PATENT DOCUMENTS

| | | |
|---|---|---|
| EP | 0 292 754 A1 | 11/1988 |
| GB | 410600 A | 5/1934 |
| GB | 2202022 A | 9/1988 |
| JP | 7-145891 A | 6/1995 |
| JP | 11-210957 A | 8/1999 |
| JP | 2010-151325 A | 7/2010 |
| KR | 10-0910340 B1 | 8/2009 |
| NO | 125950 B | 11/1972 |
| RU | 2308636 C2 | 10/2007 |
| WO | WO 2006/045887 A1 | 5/2006 |
| WO | WO 2008/152643 A2 | 12/2008 |
| WO | WO 2012107766 A1 | 8/2012 |

OTHER PUBLICATIONS

European Patent Office, "Communication with Extended Search Report," issued in connection with European Patent Application No. 14791307.3, dated Mar. 14, 2017.

International Search Report, issued in PCT/FI2014/050310, dated Jun. 18, 2014.

Written Opinion of the International Searching Authority, issued in PCT/FI2014/050310, dated Jun. 18, 2014.

Office Action issued in corresponding China Application No. 201480035747.9 dated Aug. 2, 2016 (in English).

* cited by examiner

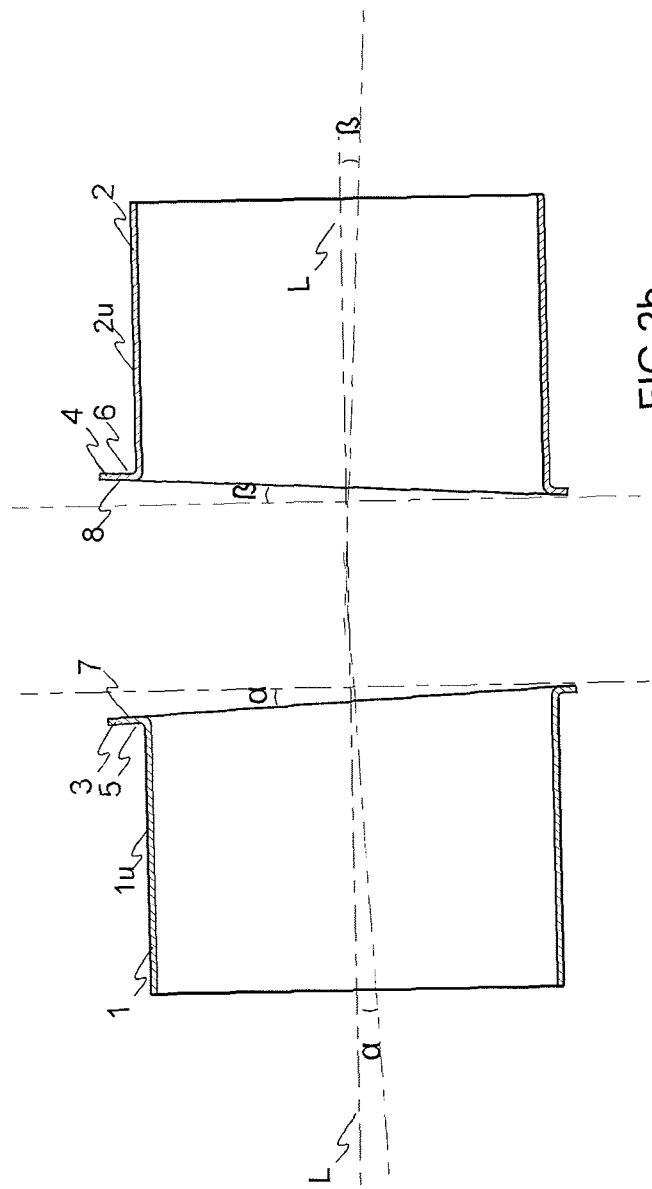

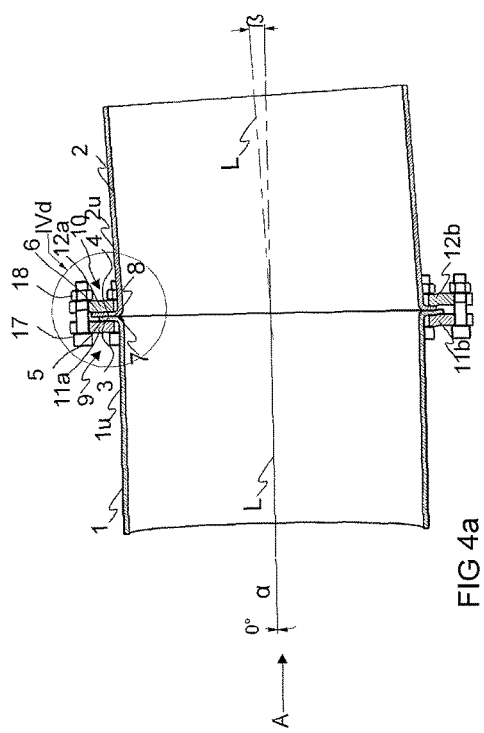
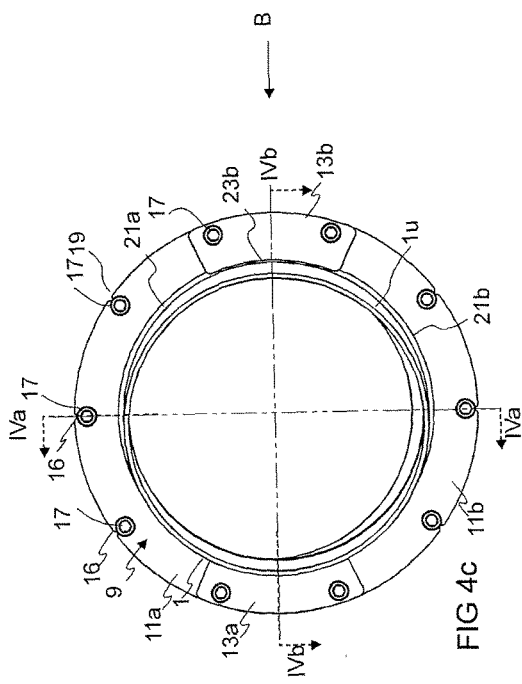
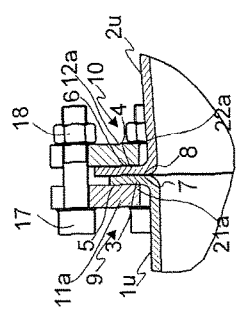
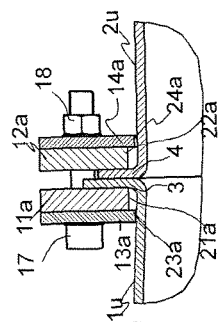

METHOD FOR FORMING A PIPE JOINT, PIPE JOINT AND FLANGE PART ARRANGEMENT

FIELD OF THE INVENTION

The object of the invention is a method for forming a pipe joint, wherein the pipe joint is formed from the end portions of the pipe sections to be joined together, said end portions having a collar, and from flange parts which, as seen from the junction, are placed on different sides of the collars and tightened with applicable fixing means, such as with screws and nuts.

The object of the invention is also a pipe joint wherein the pipe joint is formed from the end portions of the pipe sections to be joined together, said end portions having a collar, and from flange parts which, as seen from the junction, are placed on different sides of the collars and tightened with applicable fixing means, such as with screws and nuts, which collar of the pipe section is formed from the wall of the end of the pipe section by shaping with shaping means.

The object of the invention is also a flange part arrangement for a pipe joint.

BACKGROUND OF THE INVENTION

Flange joints are generally used for connecting pipes together end-on-end. They require that a collar is at the ends of both the pipes to be joined together, typically e.g. a collar that is substantially perpendicular to the longitudinal axis of the pipe, on which collar the flange part rests. The collars of the pipe sections to be joined together remain between the flanges. The flanges are provided with apertures, through which tightening means, such as screws or bolts, are arranged and the joint is tightened with nut means. There are a number of alternatives for forming the collar. One typical method is presented in U.S. Pat. No. 4,905,492, wherein the collar is formed in two stages. The end of the pipe is initially expanded to an angle of approx. 35-40 degrees and after that with a second expanding means to an angle of approx. 90 degrees relative to the longitudinal direction of the pipe. Known from publication WO2006045887 is a pipe joint, which is formed from the end portions of the pipe sections to be joined together, said end portions having a collar preferably protruding substantially perpendicularly, and from flange parts placed on different sides of the collars relative to the junction and tightened with applicable fixing means, such as with screws and nuts. In the publication the flange part has been arranged to be substantially adaptable against the shoulder of the collar, most suitably its back surface, at least when the joint is being tightened. With the solution according to the publication straight pipe joints can be effectively formed.

A need has arisen to form pipe joints by means of which small displacements, e.g. 0-10 degrees, can be brought about in the joint. This sets requirements for, inter alia, the flange part arrangement of the joint.

The aim of the present invention is to achieve a completely new type of solution for a pipe joint, by means of which small angular displacements can be effectively brought about in a joint. Another aim is to achieve a pipe joint in which angular displacements can be brought about in connection with the collaring of the ends of the pipe sections. Yet another aim is to achieve an easily installable solution for a pipe joint, in which angular displacements can be adjusted, if necessary, in the installation phase. One aim of the invention is also to achieve a flange part arrangement that can be effectively applied in pipe joints that have a collar.

BRIEF DESCRIPTION OF THE INVENTION

The method and pipe joint according to the invention are based on a concept whereby the collaring of a pipe section is formed at an angle deviating from the direction of the plane perpendicular to the longitudinal axis of the pipe section. The flange part arrangement according to the invention is based on a concept whereby arranged in it is a surface supporting from the outer surface of the wall of a pipe section for centering the pipe sections and/or flange parts to be joined together.

The method according to the invention is characterized in that the collar of a pipe section is formed from the wall of the end of the pipe section by shaping with shaping means, and in that the joint surface of the collar of at least one of the pipe sections to be joined is arranged to be divergent by the amount of an angle from the plane perpendicular to the longitudinal axis of the pipe section.

The pipe joint according to the invention is mainly characterized in that the joint surface of the collar of at least one of the pipe sections to be joined is arranged to be divergent by the amount of an angle from the plane perpendicular to the longitudinal axis of the pipe section.

The flange part arrangement according to the invention is mainly characterized in that the flange part arrangement comprises means for the mutual centering of the pipe sections to be joined together, at least at the junction, at least in the tightening phase of the joint, which means comprise at least one support surface, which is adaptable to be in contact with the outer surface of a pipe section at a distance from the support surface of the collar of the pipe section.

The solution according to the invention has a number of important advantages. With the pipe joint according to the invention mainly small angular displacements can be made in a pipeline easily and quickly. By arranging a collar on the end of a pipe section to be connected according to the invention, the joint surface of which collar deviates from the plane perpendicular to the longitudinal axis of the pipe section, a joint component is effectively obtained for bringing about an angular displacement. By arranging a collar on both pipe sections to be joined together with a joint, the joint surface of which collar deviates from the plane perpendicular to the longitudinal axis of the pipe section, a solution is achieved wherein the magnitude and/or direction of the angular displacement can be effectively adjusted by rotating one or both pipe sections relative to each other at the junction. The flange halves and the pipe sections at the junction can be centered by arranging a support surface in the flange part, e.g. in a binding part, which receives guidance from the outer surface of a pipe section. By using a centering element, which is a support surface arranged in the flange part at a distance from the support surface of the collar, e.g. in a binding part, mutual centering of the pipe sections of the joint is achieved, which improves the quality of the joint and further facilitates the mounting work. By using a flange part formed from segments it is further possible to significantly improve and accelerate the assembly of a pipe joint.

BRIEF DESCRIPTION OF THE FIGURES

In the following, the invention will be described in more detail by the aid of an embodiment with reference to the attached drawing, wherein FIGS. 2a and 2b present a simplified and sectioned view of some pipe sections to be used in an embodiment of the invention, FIG. 4a presents a pipe joint according to an embodiment of the invention, partially sectioned along the line IVa-IVa of FIG. 4c, FIG. 4b presents a pipe joint according to an embodiment of the invention, partially sectioned along the line IVb-IVb of FIG. 4c, FIG. 4c presents a pipe joint according to an embodiment of the invention, from the direction of the arrow A of FIG. 4a, FIG. 4d presents a magnified detail IVd of FIG. 4a, FIG. 4e presents a magnified detail IVe of FIG. 4b.

DETAILED DESCRIPTION OF THE INVENTION

Figure 1B:
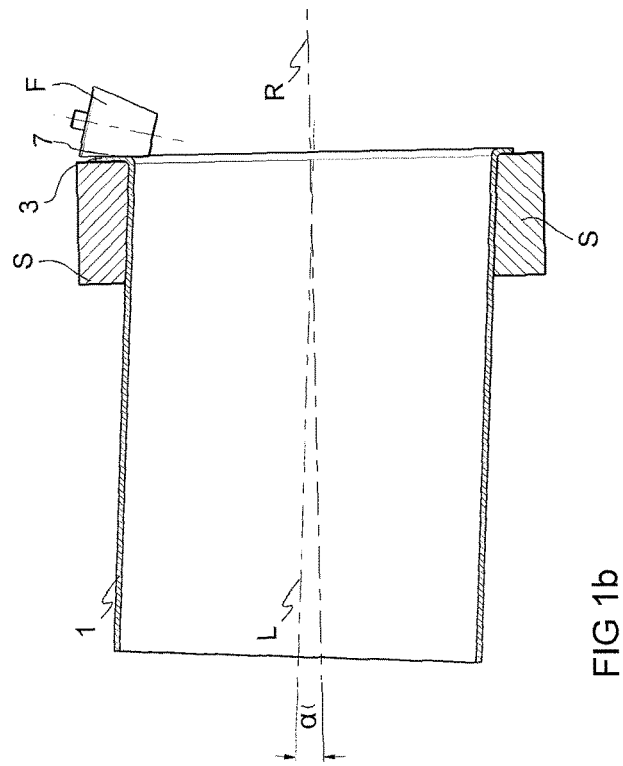
FIGS. 1a and 1b present a simplified view of the formation of a collar of a pipe section of a pipe joint according to the invention.
Figure 1A:
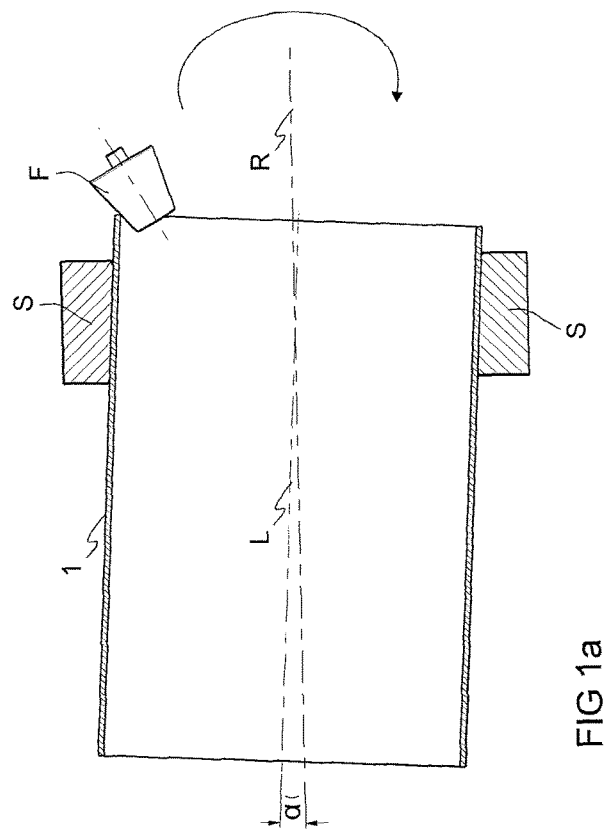

FIGS. 1a, 1b present a diagrammatic and simplified view of one arrangement for forming a collar of the end of a pipe section 1 according to one embodiment of the invention. The formation of the collar is performed e.g. with shaping means F, the drive devices of which are not presented. The shaping means F for the formation of the collar in the figure is a conical roll, which is configured to be rotated around the shaping axis R. The pipe section 1 to be collared is arranged through the aperture formed by the support part or support parts S. Known in the art are numerous means with which collars can be formed on a pipe that are substantially at a right angle on a plane transverse to the longitudinal axis of the pipe. There are numerous different methods for forming a collar 3 on the end of a pipe section 1. These are presented e.g. in publication GB 2202022 A.

In the solution according to the present patent application a collar deviating at an angle from the perpendicular plane is formed on the end of a pipe section 1, which end is before shaping at a right angle according to the plane perpendicular to the longitudinal axis L of the pipe. In FIG. 1a the pipe section 1 is arranged in the stage of forming the collar in such a way that the longitudinal axis L of the pipe section is at an angle a (alfa) relative to the shaping axis R of the shaping means F. The wall, the inside surface of it, of the end of the pipe section 1 is acted upon with the shaping means F, in which case the end of the pipe section is shaped. The shaping means is rotated around the axis R along the inside surface of the end of the pipe section 1 to be shaped in such a way that the end of the pipe section, i.e. the wall, expands typically conically from the area between the support part S and the end of the pipe section. The shaping head F is moved in relation to the pipe section in such a way that the wall of the pipe section to be collared is further shaped and the attitude of the shaping means is changed, or the shaping means is replaced, in which case in the final phase the shaping means F is pressed against the support surface S, in which case a collar 3 has been formed on the end (FIG. 1b) of the pipe section 1. The collaring of the end of the pipe section 1 can be performed with some other suitable method. What is essential is that a collar can be formed on the end of a pipe section, said collar deviating by the amount of an angle a (alfa) from the plane perpendicular to the longitudinal axis L of the pipe section. With the forming of the collar according to the figure, the width of the collar 3 in the radial direction varies. For example in the embodiment of FIG. 1 the width of the collar 3 of the pipe section 1 is greater in the top part of the cross-section than in the bottom part.

FIG. 2a presents a cross-section of an end portion of a pipe section 1, on which a collar 3 has been formed. The collar 3 has been formed on the end of the pipe section. The joint surface 7 of the collar 3 of the pipe section 1 diverges in the figure by the amount of an angle α alfa from the plane perpendicular to the longitudinal axis L of the pipe section. The collar 3 has a support surface 5 on the side facing away from the joint surface 7. According to one embodiment the angle α (alpha) is in the region of 0-6 degrees. According to one embodiment the angle α (alpha) is 1-3 degrees. The angle can also be greater or smaller than what is presented above, depending on the embodiment.

FIG. 2b presents a sectioned end portion of the second pipe section 2, on which a collar 4 has been formed. The joint surface 8 of the collar 4 of the second pipe section 2 diverges in the figure by the amount of an angle β (beta) from the plane perpendicular to the longitudinal axis L of the pipe section. The collar 4 of the second pipe section 2 has a support surface 6 on the side facing away from the joint surface 8. According to one embodiment the angle β (beta) is in the region of 0-6 degrees. According to one embodiment β (beta) is approx. 1-3 degrees. The angle can also be greater or smaller than what is presented above, depending on the embodiment.

The pipe sections 1 and 2 can be joined together with a pipe joint, more particularly with a flanged joint, by arranging the joint surfaces 7, 8 of their collars 3, 4 face-to-face and by arranging flange parts 9, 10 acting on the side facing away from the joint surfaces, i.e. on the support surfaces 5, 6 of the collar. In the embodiment according to FIGS. 3a-3e the first flange part 9 has been formed from flange segments 11a, 11b, which are arranged with binding parts 13a, 13b into a ring-shaped flange. The flange segments and the binding parts are connected to each other with jointing means, such as with screw means 17 and nut means 18. Correspondingly, the second flange part 10 has been formed from flange segments 12a, 12b, which are arranged with binding parts 14a, 14b into a ring-shaped flange. By using flange segments in the joint a flange part is achieved that can be mounted on the joint even after the formation of the collar.

In FIGS. 3a-3e the pipe sections 1 and 2 have been joined together with a flange joint by pressing the pipe sections together end-to-end by collars 3, 4 formed at the ends of the pipe sections. The pipe sections 1, 2 are pressed against each other by means of flange parts 9, 10 on the side facing away from the joint surfaces 7, 8 of the collars 3, 4, i.e. from the support surfaces 5, 6 of the collar. The flange parts are pressed against each other with tightening means, such as with screw means 17 and nut means 18 arranged in holes 16 formed through the flange means as in the embodiment of the figure. The flange means 9, 10 on the different sides of the joint remain between the head of the screw means 17 and the nut means 18.

Figure 3A:
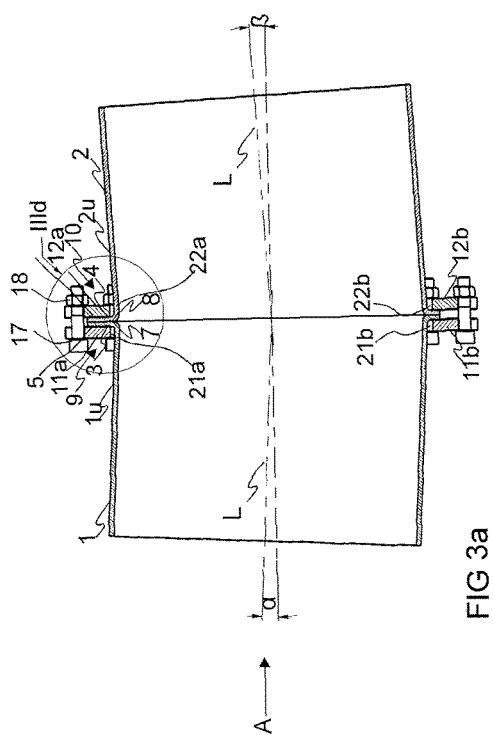
FIG. 3a presents a pipe joint according to an embodiment of the invention, partially sectioned along the line IIIc-IIIc of FIG. 3c.
Figure 3B:
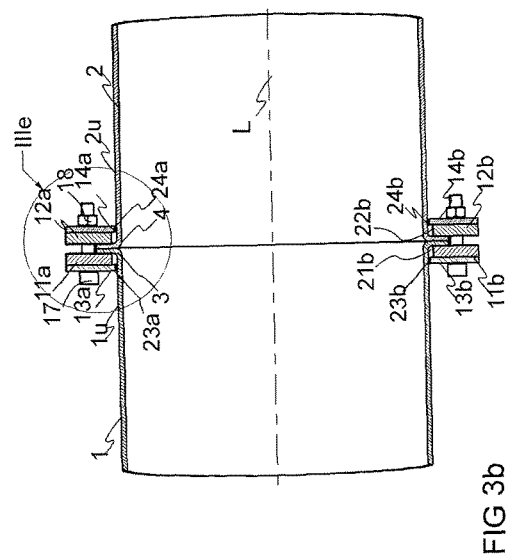
FIG. 3b presents a pipe joint according to an embodiment of the invention, partially sectioned along the line IIIb-IIIb of FIG. 3c.
Figure 3C:
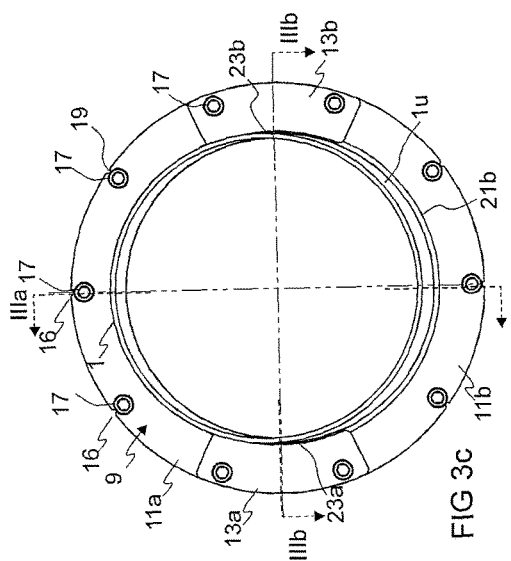
FIG. 3c presents a pipe joint according to an embodiment of the invention, from the direction of the arrow A of FIG. 3a, FIG. 3d presents a magnified detail IIId of FIG. 3a, FIG. 3e presents a magnified detail IIIe of FIG. 3b.
Figure 3D:
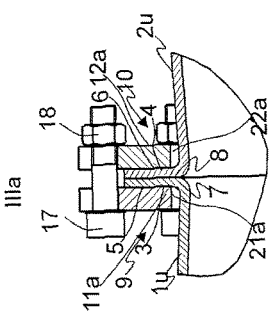
Figure 3E:
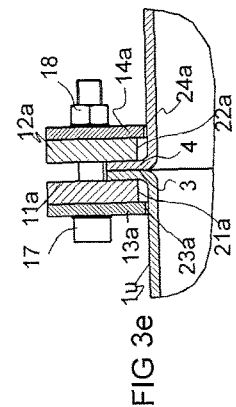
Figure 5C:
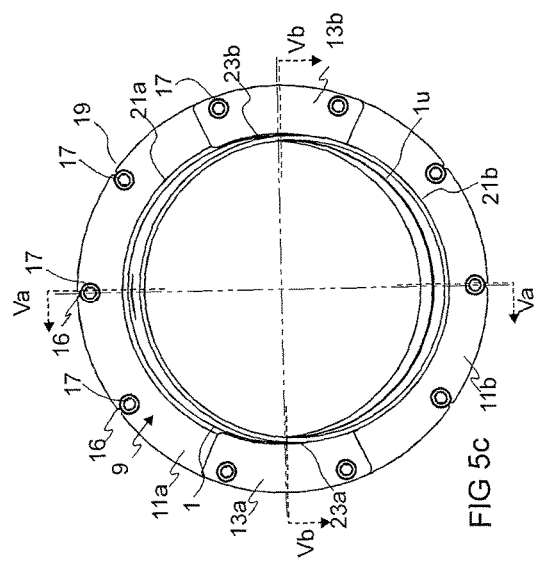
FIG. 5c presents a pipe joint according to an embodiment of the invention, from the direction of the arrow A of FIG. 5a, FIG. 5d presents a magnified detail Vd of FIG. 5d.
Figure 5D:
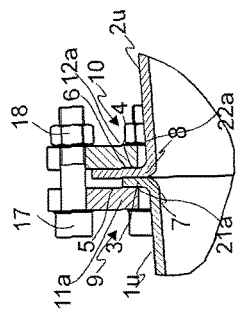
FIG. 5a presents a pipe joint according to an embodiment of the invention, partially sectioned along the line Va-Va of FIG. 5c.
FIG. 5b presents a pipe joint according to an embodiment of the invention, partially sectioned along the line Vb-Vb of FIG. 5c.
FIG. 5e presents a magnified detail Ve of FIG. 5b.
Figure 5E:
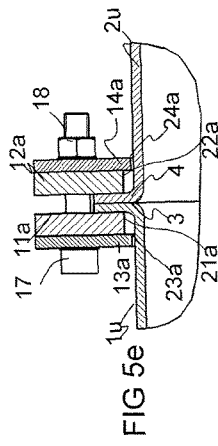
Figure 5A:
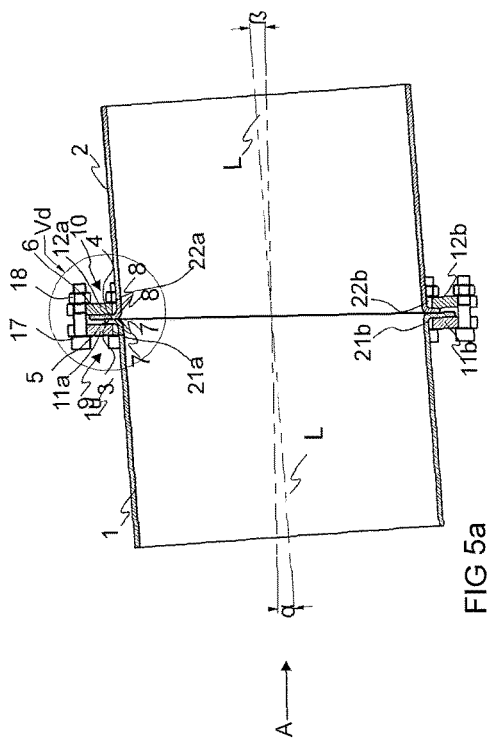
Figure 5B:
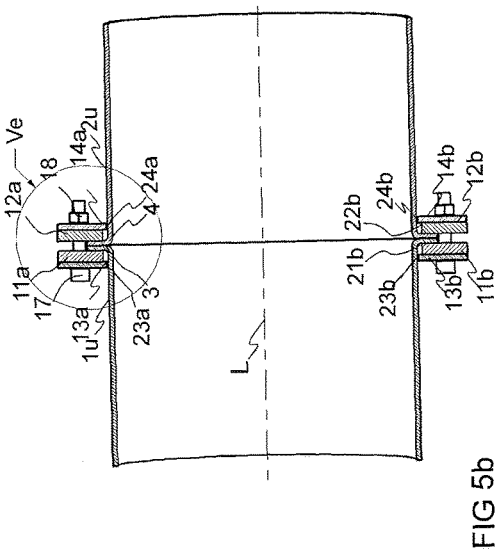

In the case according to FIGS. 3a-3e, the joint surface 7 of the collar 3 of the first pipe section 1 has been formed at an angle α (alfa) deviating from the plane perpendicular to the longitudinal axis L of the pipe section, which is marked in FIG. 3a relative to the longitudinal axis L of the pipe section 1. Correspondingly, the joint surface 8 of the collar 4 of the second pipe section 2 has been formed at an angle β (beta) deviating from the plane perpendicular to the longitudinal axis L of the second pipe section, which is marked in FIG. 3a relative to the longitudinal axis L of the pipe section 2. In the figure an angle is obtained on the vertical plane in the pipe joint for the pipe sections to be joined together, which angle has been diverged with respect to the longitudinal axis L of the first pipe section by the amount of the angle α (alfa)+β (beta). If the angle α (alfa) is e.g. 3 degrees and the angle β (beta) is 3 degrees, a total angular displacement that is 6 degrees is obtained in the pipe joint. In this case the angular deviations of the joint surfaces of the pipe sections act in the same direction with respect to the plane perpendicular to the longitudinal axis of the pipe section. In the cross-section of the horizontal plane (FIG. 3b) the pipe sections 1, 2 in the joint do not have an angular displacement.

Figure 6:
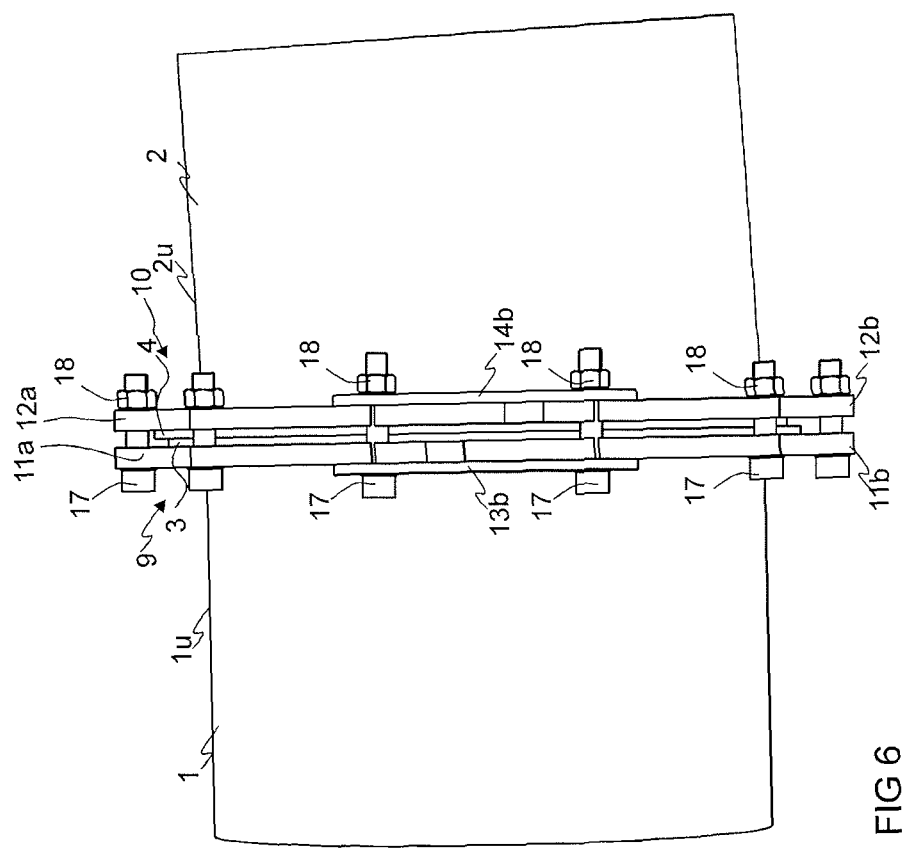
FIG. 6 presents a pipe joint according to an embodiment of the invention, from the direction of the arrow B of FIG. 4c.

With the solution according to the invention, it is possible to achieve joints wherein the angular deviation between pipe sections can be adjusted by rotating one of the pipe sections 1, 2 or both of the pipe sections 1, 2 relative to each other on the plane of the joint. In FIGS. 4a-4e the first pipe section 1 has been rotated in relation to the second pipe section 2 counterclockwise by the amount of an angle of rotation of 90 degrees compared to the situation of FIGS. 3a-3e. In this case the pipe sections 1, 2 have an angular deviation on the vertical plane (FIG. 4a), which is formed solely from the deviation of the plane of the joint surface 8 of the pipe section 2 from the plane perpendicular to its longitudinal axis L, i.e. by the amount of the angle β (beta). Correspondingly, on the horizontal plane (FIG. 4b) the first pipe section 1 has an angular deviation α (alfa). FIG. 6 presents the pipe joint of FIGS. 4a-4e from the direction of the arrow B of FIG. 4c. FIGS. 7a-7e present the pipe sections 1, 2 (without a flange part arrangement) of a corresponding joint, before the formation of the joint.

In FIGS. 5a-5e the first pipe section 1 has been rotated in relation to the second pipe section 2 counterclockwise by the amount of an angle of rotation of 90 degrees compared to the situation of FIGS. 4a-4e (or by the amount of an angle of rotation of 180 degrees compared to the situation of FIGS. 3a-3e). In this case the angular deviation α (alfa) of the joint plane of the first pipe section acts in a different direction in the cross-section of the vertical plane of FIG. 5a than the angular deviation β (beta) of the joint plane of the second pipe section. There is not in this case an angular deviation in the longitudinal direction of the pipe sections 1, 2, but the joint plane is arranged at an angle relative to the vertical plane perpendicular to the longitudinal axis of the pipes.

The pipe joint according to the invention, wherein the joint surface 7, 8 of at least one pipe section 1, 2 to be connected in the joint is arranged at an angle of α (alfa) or at an angle of (β) (beta) to the plane perpendicular to the longitudinal axis L of the pipe section. With the solution according to the invention, versatile opportunities are achieved for implementing small angular displacements in connection with pipe joints. The invention enables the formation of small angular displacements by providing the ends of pipe sections 1, 2 that are originally formed to be straight with collars that are "inclined", i.e. that are at an angle of α (alfa) or at an angle of β (beta) to the plane perpendicular to the longitudinal axis L of the pipe section.

The pipe joint according to the invention is formed from the end portions of the pipe sections 1, 2 to be joined together, said end portions having a collar 3, 4, at least one of which collars is formed at an angle to the plane perpendicular to the longitudinal axis of the pipe section, and from flange parts 9, 10 which, as seen from the junction, are placed on different sides of the collars and tightened with applicable fixing means, such as with screws 17 and nuts 18.

When forming the joint it is possible to act on the angular displacement occurring between the pipe sections at the point of the junction, on the magnitude of said displacement and/or the direction of the angular displacement. When both the joint surfaces of the collars of the pipe sections are arranged at an angle deviating from the plane perpendicular to the longitudinal axis it is possible, by turning (before tightening the joint) the pipe section or pipe sections relative to each other at the junction, to act upon the total angular deviation and/or direction of the junction.

A flange part can be formed as a circular, preferably ring-like, flange part In this case the flange part must be threaded onto the pipe sections for the formation of the joint, typically before the formation of the collar.

According to one preferred embodiment the flange part 9, 10 is formed from segments 11a, 11b; 12a, 12b. By using segments in the joint, a flange part is obtained that can be mounted on the joint even after the collar has been formed.

When using a flange part formed from segments, the joint comprises at least two binding parts 13a, 13b; 14a, 14b, with which the segments 11a, 11b; 12a, 12b of the flange part are joined into a ring.

The joint further comprises means for the mutual centering of the pipe sections 1, 2 to be joined together, at least at the junction, at least in the tightening phase of the joint. In this case tightening the different tightening elements of the joint results in mutual centering of the pipe sections.

The flange part arrangement is an essential factor in the pipe joint according to the invention. The flange part arrangement comprises means for the mutual centering of the pipe sections 1, 2 to be joined together, at least at the junction, at least in the tightening phase of the joint, which means comprise at least one support surface 23a, 23b; 24a, 24b, which is adapted to be in contact with the outer surface 1u, 2u of a pipe section 1, 2 at a distance from the support surface 5, 6 of the collar 3, 4 of the pipe section in the longitudinal direction of the pipe.

The flange part 9, 10 is formed from at least two flange segments 11a, 11b; 12a, 12b and further comprises at least one binding part 13a, 13b; 14a, 14b, with which the flange segments 11a, 11b; 12a, 12b of the flange part 9, 10 are joined into a ring. In the embodiment according to the figures there are two flange segments and two binding parts are arranged to connect them. In this case the flange part is formed from two flange segments and two binding parts. It is conceivable that there are more than two flange segments and/or binding parts.

The inner rim 21a, 21b; 22a, 22b of a flange segment 11a, 11b; 12a, 12b of a flange part 9, 10 on the pipe section 1, 2 side is at a distance from the outer wall 1u, 2u of the pipe section. This arrangement is because, inter alia, there is typically a curved section at the transition point between the support surface 5, 6 of the collar 3, 4 of a pipe section and the outer surface 1u, 2u of the longitudinal wall of the pipe section. The inner rim 21a, 21b; 22a, 22b of a flange segment is arranged at a distance from the outer surface 1u, 2u of the wall of a pipe section, where the curved section of the collar and the outer surface of the wall of the pipe section no longer has an effect. In this case a flange segment does not particularly need to be shaped to correspond particularly to the curvature of the transition point of the support surface of the collar and the wall of the pipe section. When tightened, the flange part is pressed effectively against the support surface of the collar. The binding part 13a, 13b; 14a, 14b, which is arranged on the opposite side of the flange segment 11a, 11b; 12a, 12b with respect to the collar 3, 4 of the pipe section, comprises a support surface 23a, 23b; 24a, 24b, which is adaptable to be in contact with the outer surface 1u, 2u of the pipe section 1, 2. In the embodiment of the figures the support surface is a surface of the binding part facing the outer surface of the pipe section.

There is at least one of the support surfaces 23a, 23b; 24a, 24b, which is adaptable to be in contact with the outer surface 1u, 2u of a pipe section, on the side of each pipe section 1, 2 of the joint.

There are at least two of the support surfaces 23a, 23b; 24a, 24b, which is adaptable to be in contact with the outer surface of a pipe section, on the side of each pipe section 1, 2 of the joint.

The binding part 13a, 13b; 14a, 14 is a curved plate part in the embodiment of the figures, the height of which in the radial direction is, in the embodiment of the figures, to some extent greater than the height of a flange segment 11a, 11b; 12a, 12b in the radial direction. In the embodiment of the figures the thickness of a binding part is to some extent smaller than the thickness of a flange segment.

Slots 16, openings or corresponding easings are formed in at least one of the flange parts, mainly to improve the adaptability. In FIGS. 3a-5e notches 19 are arranged in a flange part between the holes 16 and the outer rim of the flange part.

Figure 7C:
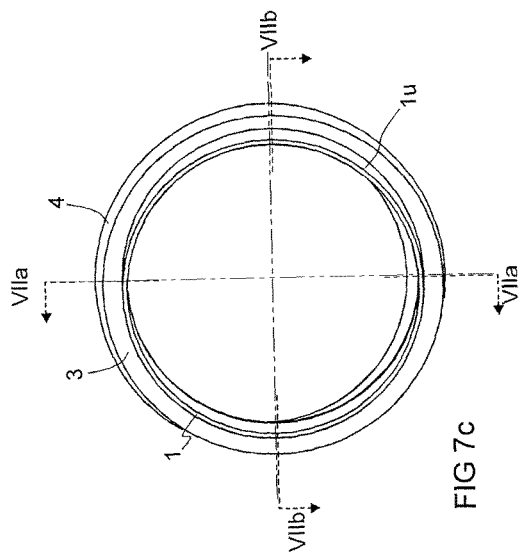
FIG. 7c presents the pipe sections of a pipe joint according to an embodiment of the invention, before formation of the joint, from the direction of the arrow A of FIG. 7a, FIG. 7d presents a magnified detail VIId of FIG. 7a, and FIG. 7e presents a magnified detail VIIe of FIG. 7b.
Figure 7D:
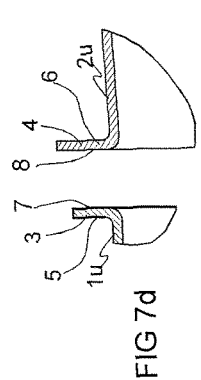
FIG. 7a presents the pipe sections of a pipe joint according to an embodiment of the invention, before formation of the joint, partially sectioned along the line VIIa-VIIa of FIG. 7c.
FIG. 7b presents the pipe sections of a pipe joint according to an embodiment of the invention, before formation of the joint, partially sectioned along the line VIIb-VIIb of FIG. 7c.
Figure 7E:
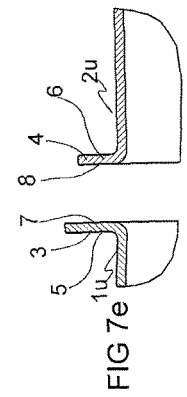
Figure 7A:
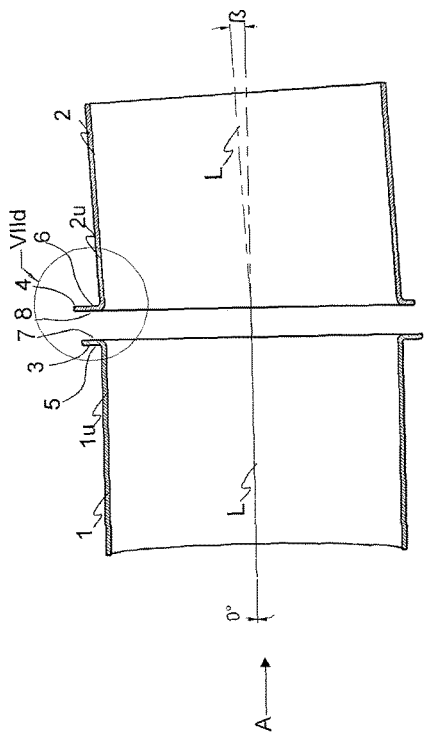
Figure 7B:
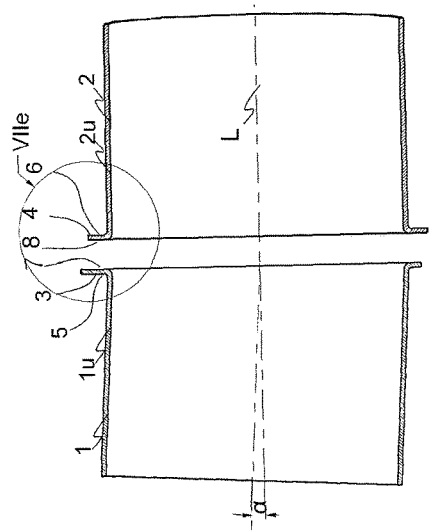

FIGS. 7a-7e further present, for the sake of clarity, the pipe sections 1, 2 to be used in a pipe joint according to an embodiment of the invention, before formation of the joint. In FIGS. 7a-7e the first pipe section 1 has been rotated in relation to the second pipe section 2 counterclockwise by the amount of an angle of rotation of 90 degrees compared to the situation of FIGS. 3a-3e. In this case the pipe sections 1, 2 have an angular deviation on the vertical plane (FIG. 7a), which forms solely from deviation of the plane of the joint surface 8 of the pipe section 2 from the plane perpendicular to its longitudinal axis L, i.e. by the amount of the angle β (beta). Correspondingly, on the horizontal plane (FIG. 7b) the first pipe section has an angular deviation α (alfa). FIG. 7c and the FIGS. 7d and 7e presenting details also illustrate the eccentricity of the collars 3, 4 and the changing of their height in the radial direction. This sets its own requirements for the flange part arrangement according to the invention.

The invention relates to a method for forming a pipe joint, which pipe joint is formed from the end portions of the pipe sections 1, 2 to be joined together, said end portions having a collar 3, 4, and from flange parts 9, 10 which are placed, as seen from the junction, on different sides of the collars and tightened with applicable fixing means, such as with screws 17 and nuts 18. In the method the collar 3, 4 of a pipe section is formed from the wall of the end of the pipe section by shaping with shaping means F. According to an embodiment of the method the joint surface 7, 8 of the collar 3, 4 of at least one of the pipe sections 1, 2 to be joined is arranged to be divergent by the amount of an angle α, β from the plane perpendicular to the longitudinal axis L of the pipe section.

According to one embodiment the joint surface 7 of the collar 3 formed on the end of the first pipe section 1 to be joined is arranged to diverge by the amount of an angle α alfa from the plane perpendicular to the longitudinal axis L of the pipe section.

According to one embodiment the joint surface 8 of the collar 4 formed on the end of the second pipe section 2 to be joined is arranged to diverge by the amount of an angle β beta from the plane perpendicular to the longitudinal axis L of the pipe section.

According to one embodiment the magnitude of the combined angular deviation brought about by the pipe sections 1, 2 of the joint is adjusted by rotating one or both of the pipe sections 1, 2 in relation to each other at the junction, before tightening of the joint.

According to one embodiment the direction of the combined angular deviation brought about by the pipe sections 1, 2 of the joint is adjusted by rotating one or both of the pipe sections 1, 2 in relation to each other at the junction, before tightening of the joint.

According to one embodiment the flange part 9, 10 is formed from at least two flange segments 11a, 11b; 12a, 12b.

According to one embodiment the joint surface 7, 8 of the collar 3, 4 of at least one of the pipe sections 1, 2 is arranged to be divergent by the amount of an angle α, β from the plane perpendicular to the longitudinal axis L of the pipe section 1, 2, which angle is 0.5-10 degrees.

According to one embodiment slots 19, openings or corresponding easings are formed in at least one of the flange parts 9, 10, mainly to improve the adaptability.

According to one embodiment the flange parts 9, 10 and the tightening means 17, 18 have been arranged as a complete package that is mounted directly on the joint According to one embodiment in the method the pipe sections 1, 2 to be joined together are mutually centered, at least at the junction, at least in the tightening phase of the joint, with means for mutually centering the pipe sections to be joined together, which means comprise at least one support surface 23a, 23b; 24a, 24b, which is adapted to be in contact with the outer surface 1u, 2u of a pipe section 1, 2 at a distance from the support surface 5, 6 of the collar 3, 4 of the pipe section.

According to one embodiment the joint comprises at least one binding part 13a, 13b; 14a, 14b, with which the segments 11a, 11b; 12a, 12b of the flange part 9, 10 are joined into a ring.

The invention thus relates to a pipe joint, which is formed from the end portions of the pipe sections 1, 2 to be joined together, said end portions having a collar 3, 4, and from flange parts 9, 10 which are placed, as seen from the junction, on different sides of the collars and tightened with applicable fixing means, such as with screws 17 and nuts 18. The collar 3, 4 of a pipe section 1, 2 is formed from the wall of the end of the pipe section by shaping with shaping means F. The joint surface 7, 8 of the collar 3, 4 of at least one of the pipe sections 1, 2 to be joined is arranged to be divergent by the amount of an angle α, β from the plane perpendicular to the longitudinal axis L of the pipe section.

According to one embodiment the joint surface 7 of the collar 3 formed on the end of the first pipe section 1 to be joined is arranged to diverge by the amount of an angle α alfa from the plane perpendicular to the longitudinal axis L of the pipe section.

According to one embodiment the joint surface 8 of the collar 4 formed on the end of the second pipe section 2 to be joined is arranged to diverge by the amount of an angle α beta from the plane perpendicular to the longitudinal axis L of the pipe section.

According to one embodiment the magnitude of the combined angular deviation brought about by the pipe sections 1, 2 of the joint is configured to be adjustable by rotating one or both of the pipe sections 1, 2 in relation to each other at the junction, before tightening of the joint.

According to one embodiment the direction of the combined angular deviation brought about by the pipe sections 1, 2 of the joint is configured to be adjustable by rotating one or both of the pipe sections 1, 2 in relation to each other at the junction, before tightening of the joint.

According to one embodiment the flange part 9, 10 is formed from at least two flange segments 11a, 11b; 12a, 12b.

According to one embodiment the joint surface 7, 8 of the collar 3, 4 of at least one of the pipe sections 1, 2 is arranged to be divergent by the amount of an angle α, β from the plane perpendicular to the longitudinal axis L of the pipe section 1, 2, which angle is 0.5-10 degrees.

According to one embodiment slots 19, openings or corresponding easings are formed in at least one of the flange parts 9, 10, mainly to improve the adaptability.

According to one embodiment the flange parts 9, 10 and the tightening means 17, 18 have been arranged as a complete package that can be mounted directly on the joint.

According to one embodiment the joint comprises means for the mutual centering of the pipe sections 1, 2 to be joined together, at least at the junction, at least in the tightening phase of the joint, which means comprise at least one support surface 23a, 23b; 24a, 24b, which is adapted to be in contact with the outer surface 1u, 2u of a pipe section 1, 2 at a distance from the support surface 5, 6 of the collar 3, 4 of the pipe section.

According to one embodiment the joint comprises at least one binding part 13a, 13b; 14a, 14b, with which the segments 11a, 11b; 12a, 12b of the flange part 9, 10 are joined into a ring.

According to one embodiment in the joint the inner rim 21a, 21b; 22a, 22b of a flange segment 11a, 11b; 12a, 12b of a flange part 9, 10 on the pipe section 1, 2 side is at a distance from the outer wall 1u, 2u of the pipe section. The binding part 13a, 13b; 14a, 14b, which is arranged on the opposite side of the flange segment 11a, 11b; 12a, 12b with respect to the collar 3, 4 of the pipe section, comprises a support surface 23a, 23b; 24a, 24b, which is adaptable to be in contact with the outer surface 1u, 2u of the pipe section 1, 2.

The invention also relates to a flange part arrangement for a pipe joint, which pipe joint is formed from the end portions of the pipe sections 1, 2 to be joined together, said end portions having a collar 3, 4, and from flange parts 9, 10, which are placed, as seen from the junction, on different sides of the collars 3, 4 and tightened with applicable fixing means, such as with screws 17 and nuts 18. The flange part arrangement comprises means for the mutual centering of the pipe sections 1, 2 to be joined together, at least at the junction, at least in the tightening phase of the joint, which means comprise at least one support surface 23a, 23b; 24a, 24b, which is adaptable to be in contact with the outer surface 1u, 2u of a pipe section 1, 2 at a distance from the support surface 5, 6 of the collar 3, 4 of the pipe section.

According to one embodiment the flange part 9, 10 is formed from at least two flange segments 11a, 11b; 12a, 12b and further comprises at least one binding part 13a, 13b; 14a, 14b, with which the segments 11a, 11b; 12a, 12b of the flange part 9, 10 are joined into a ring.

According to one embodiment the inner rim 21a, 21b; 22a, 22b of a flange segment 11a, 11b; 12a, 12b of a flange part 9, 10 on the pipe section 1, 2 side is at a distance from the outer wall 1u, 2u of the pipe section and that the binding part 13a, 13b; 14a, 14b, which is arranged on the opposite side of the flange segment 11a, 11b; 12a, 12b with respect to the collar 3, 4 of the pipe section, comprises a support surface 23a, 23b; 24a, 24b, which is adaptable to be in contact with the outer surface 1u, 2u of the pipe section 1, 2.

According to one embodiment there is at least one of the support surfaces 23a, 23b; 24a, 24b, which is adaptable to be in contact with the outer surface 1u, 2u of a pipe section 1, 2, on the side of each pipe section 1, 2 of the joint.

According to one embodiment there are at least two of the support surfaces 23a, 23b; 24a, 24b, which is adaptable to be in contact with the outer surface 1u, 2u of a pipe section 1, 2, on the side of each pipe section 1, 2 of the joint.

According to one embodiment the flange part arrangement is configured to be applicable in the method, according to what is presented any aforementioned embodiments and for forming a pipe joint, or to be applicable in a pipe joint according to any of the embodiments.

The flange parts, flange means, segments according to the invention can be advantageously produced e.g. by die-cutting or cutting, e.g. by laser cutting, from a desired material that fulfills the requirements pertaining to the application, e.g. from metal plate.

It is obvious to the person skilled in the art that the invention is not limited to the embodiments presented above, but that it can be varied within the scope of the claims presented below. The characteristic features possibly presented in the description in conjunction with other characteristic features can if necessary be used separately to each other.

The invention claimed is:

1. A flange part arrangement for a pipe joint, which pipe joint is formed from end portions of pipe sections to be joined together, each end portion having a collar, and flange parts which, as seen from the junction, are placed on different sides of the collars and fastened together,
wherein the flange part arrangement comprises at least one support surface for the mutual centering of the pipe sections to be joined together, which receive guidance from an outer surface of the pipe section at a distance from at least one support surface of the collar of the pipe section,
wherein an inner rim of a flange segment of the flange part is at a distance from the outer surface of the pipe section, and
wherein at least one binding part, which is arranged on the opposite side of the flange segment with respect to the collar of the pipe section, comprises the at least one support surface, receives guidance from the outer surface of the pipe section.

2. The flange part arrangement according to claim 1, wherein each flange part is formed from at least two flange segments and further comprises the at least one binding part, with which the segments of the flange part are joined into a ring.

3. The flange part arrangement according to claim 1, wherein the at least one support surface of the at least one binding part is adaptable to be in contact with the outer surface of a pipe section, on the side of each pipe section of the joint.

4. The flange part arrangement according to claim 1, wherein there are at least two of the support surfaces of the at least one binding part, which are adaptable to be in contact with the outer surface of a pipe section, on the side of each pipe section of the joint.

5. A pipe joint, which is formed from the end portions of the pipe sections to be joined together, comprising:
collars, each collar having a joint surface and a support surface; and
flange parts which are placed on different sides of the collars and fastened together,
wherein each collar of the pipe section is formed from the wall of the end portion of the pipe section by shaping,
wherein the joint surface of the collar of at least one of the pipe sections to be joined is arranged to be divergent by the amount of an angle from a plane perpendicular to the longitudinal axis the at least one of the pipe section,
wherein the flange parts comprises at least one support surface, which receives guidance from an outer surface of a pipe section at a distance from the support surface of the collar of the pipe section,
wherein an inner rim of a flange segment of each flange part is at a distance from the outer surface of the pipe section, and
wherein a binding part, which is arranged on the opposite side of the flange segment with respect to the collar of the pipe section, comprises the at least one support surface and receives guidance from the outer surface of the pipe section.

6. The pipe joint according to claim 5, wherein the joint surface of the collar formed on the end of a first pipe section to be joined is arranged to diverge by an amount of an angle from a plane perpendicular to the longitudinal axis of the first pipe section.

7. The pipe joint according to claim 5, wherein the joint surface of the collar formed on the end of a second pipe section to be joined is arranged to diverge by an amount of an angle from a plane perpendicular plane to a longitudinal axis of the second pipe section.

8. The pipe joint according to claim 5, wherein a magnitude of a combined angular deviation brought about by the pipe sections of the joint is configured to be adjustable by rotating one or both of the pipe sections in relation to each other at the junction, before tightening of the joint.

9. The pipe joint according to claim 5, wherein a direction of a combined angular deviation brought about by the pipe sections of the joint is configured to be adjustable by rotating one or both of the pipe sections in relation to each other at the junction, before tightening of the joint.

10. The pipe joint according to claim 5, wherein each flange part is formed from at least two flange segments.

11. The pipe joint according to claim 5, a joint surface of the collar of at least one of the pipe sections is arranged to be divergent by the amount of an angle from a plane perpendicular to a longitudinal axis of the at least one of the pipe sections, which angle is 0.5-10 degrees.

12. The pipe joint according to claim 5, wherein slots, openings or corresponding easings are formed in at least one of the flange parts, mainly to improve the adaptability.

13. The pipe joint according to claim 5, wherein the flange parts and fasteners for fastening the flange parts together are arranged as a complete package that can be mounted directly on the collars.

14. The pipe joint according to claim 5, wherein the binding part and the flange part are joined into a ring.

15. A method for forming a pipe joint, comprising the following steps:
providing pipe sections with end portions to be joined together,
providing a collar on each of said end portions, each collar having a joint surface and a support surface,
providing flange parts at a junction of the collars, said flange parts being placed on different sides of the collars and fastened together,
shaping each collar of the pipe sections from a wall of the end portion of each of the pipe sections, and
arranging the joint surface of the collar of at least one of the pipe sections to be joined to be divergent by an angle $\alpha$, $\beta$ from a plane perpendicular to a longitudinal axis of the pipe section,
wherein the pipe sections to be joined together are mutually centered, at least at the junction, at least in the tightening phase of the joint, with at least one support surface which receives guidance from an outer surface of the pipe section at a distance from the support surface of the collar of the pipe section,
wherein an inner rim of a flange segment of each flange part is at a distance from the outer surface of the pipe section, and
wherein a binding part, which is arranged on an opposite side of the flange segment with respect to the collar of the pipe section, comprises the at least one support surface and receives guidance from the outer surface of the pipe section.

16. The method according to claim 15, wherein the joint surface of the collar formed on the end portion of a first pipe section to be joined is arranged to diverge by an amount of an angle from a plane perpendicular to a longitudinal axis of the first pipe section.

17. The method according to claim 15, wherein the joint surface of the collar formed on the end portion of a second pipe section to be joined is arranged to diverge by an amount of an angle from a plane perpendicular to a longitudinal axis of the second pipe section.

18. The method according to claim 15, wherein a magnitude of the combined angular deviation brought about by the pipe sections of the joint is adjusted by rotating one or both of the pipe sections in relation to each other at the junction, before tightening of the joint.

19. The method according to claim 15, wherein a direction of the combined angular deviation brought about by the pipe sections of the joint is adjusted by rotating one or both of the pipe sections in relation to each other at the junction, before tightening of the joint.

20. The method according to claim 15, wherein each flange part is formed from at least two flange segments.

21. The method according to claim 15, wherein the joint surface of the collar of at least one of the pipe sections is arranged to be divergent by the amount of an angle from the plane perpendicular to the longitudinal axis of the pipe section, which angle is 0.5-10 degrees.

22. The method according to claim 15, wherein slots, openings or corresponding easings are formed in at least one of the flange parts, mainly to improve the adaptability.

23. The method according to claim 15, wherein the flange parts and fasteners for fastening the flange parts together are arranged as a complete package that is mounted directly on the collars.

24. The method according to claim 15, wherein the binding part and the flange segment of the flange part are joined into a ring.

* * * * *